US005898108A

United States Patent [19]

Mieczkowski et al.

[11] Patent Number: 5,898,108

[45] Date of Patent: Apr. 27, 1999

[54] EVAPORATIVE EMISSION TESTER

[75] Inventors: Daniel Mieczkowski; Mark J. Hasenberg; Thomas P. Becker; Matthew M. Crass; Robert D. Braun, all of Kenosha; Edward T. Gisske, Mount Horeb; Donald J. Caldwell, Milwaukee, all of Wis.

[73] Assignee: Snap-on Technologies, Inc., Lincolnshire, Ill.

[21] Appl. No.: 08/976,143

[22] Filed: Nov. 21, 1997

Related U.S. Application Data

[60] Division of application No. 08/563,898, Nov. 22, 1995, Pat. No. 5,763,764, which is a continuation-in-part of application No. 08/369,481, Jan. 6, 1995, abandoned.

[51] Int. Cl.[6] .......... G01M 15/00

[52] U.S. Cl. .......... 73/118.1; 73/861.52; 73/861.61; 73/861.63; 73/861.64

[58] Field of Search .......... 73/118.1, 861.42, 73/861.52, 861.61, 861.63, 861.64, 116, 117.2, 117.3, 118.2; 123/520

[56] References Cited

U.S. PATENT DOCUMENTS

| | | | |
|---|---|---|---|
| 3,713,337 | 1/1973 | Stroman . | |
| 3,733,902 | 5/1973 | Halmi . | |
| 3,733,903 | 5/1973 | Halmi . | |
| 3,960,142 | 6/1976 | Elliott et al. . | |
| 4,238,965 | 12/1980 | Mate . | |
| 4,422,339 | 12/1983 | Gall et al. | 73/861.61 |
| 4,555,952 | 12/1985 | Jenkins | 73/861.61 |
| 4,562,744 | 1/1986 | Hall et al. | 73/861.61 |
| 4,571,996 | 2/1986 | Wakeman et al. . | |
| 4,599,906 | 7/1986 | Freud et al. | 73/861.52 |
| 4,654,813 | 3/1987 | Edlund et al. . | |
| 4,730,500 | 3/1988 | Hughes . | |
| 4,754,651 | 7/1988 | Shortridge et al. . | |
| 4,825,704 | 5/1989 | Aoshima et al. . | |
| 4,835,717 | 5/1989 | Michel et al. . | |
| 4,949,695 | 8/1990 | Uranishi et al. | 123/520 |
| 4,986,127 | 1/1991 | Shimada et al. . | |
| 4,986,135 | 1/1991 | Corser et al. . | |
| 4,991,426 | 2/1991 | Evans . | |
| 5,012,677 | 5/1991 | Shimada et al. . | |
| 5,014,543 | 5/1991 | Franklin . | |
| 5,060,621 | 10/1991 | Cook et al. . | |
| 5,063,787 | 11/1991 | Khuzai et al. | 73/861.64 |
| 5,080,078 | 1/1992 | Hamburg | 123/519 R |
| 5,086,403 | 2/1992 | Slocum et al. . | |
| 5,086,655 | 2/1992 | Fredericks et al. | 73/861.61 |
| 5,111,827 | 5/1992 | Rantala . | |
| 5,146,901 | 9/1992 | Jones . | |
| 5,146,902 | 9/1992 | Cook et al. . | |
| 5,150,689 | 9/1992 | Yano et al. . | |
| 5,152,167 | 10/1992 | Moody . | |
| 5,182,952 | 2/1993 | Pyzik . | |
| 5,191,870 | 3/1993 | Cook . | |
| 5,201,212 | 4/1993 | Williams . | |
| 5,201,213 | 4/1993 | Henning . | |
| 5,209,210 | 5/1993 | Ikeda et al. . | |
| 5,216,995 | 6/1993 | Hosoda et al. | 123/520 |
| 5,239,858 | 8/1993 | Rogers et al. . | |
| 5,243,545 | 9/1993 | Ormond . | |
| 5,243,853 | 9/1993 | Steinbrenner et al. . | |
| 5,249,561 | 10/1993 | Thompson . | |
| 5,261,268 | 11/1993 | Namba . | |
| 5,261,379 | 11/1993 | Lipinski et al. | 123/520 |
| 5,267,470 | 12/1993 | Cook . | |

(List continued on next page.)

*Primary Examiner*—Richard Chilcot
*Assistant Examiner*—Eric S. McCall
*Attorney, Agent, or Firm*—Emrich & Dithmar

[57] ABSTRACT

An evaporative emission tester is used to evaluate the integrity of a vehicle's evaporative emission control system, including determining the system's purge capability. The emission tester performs a purge flow test to determine whether fuel vapor stored in the vehicle's evaporative canister and present in the fuel tank is being drawn into the engine for combustion at a minimum amount. The emission tester also performs a pressure test of the vehicle's evaporative canister purge system, which includes the fuel tank and lines. The emission tester can function as a stand-alone unit or as an integrated product with a host computer.

10 Claims, 5 Drawing Sheets

U.S. PATENT DOCUMENTS

| | | | |
|---|---|---|---|
| 5,269,171 | 12/1993 | Boyer | |
| 5,273,020 | 12/1993 | Hayami . | |
| 5,275,144 | 1/1994 | Gross . | |
| 5,275,145 | 1/1994 | Tuckey . | |
| 5,284,050 | 2/1994 | Iida et al. . | |
| 5,317,909 | 6/1994 | Yamada et al. . | |
| 5,335,638 | 8/1994 | Mukai . | |
| 5,359,978 | 11/1994 | Kidokoro et al. . | |
| 5,365,795 | 11/1994 | Brower, Jr. | 73/861.63 |
| 5,373,822 | 12/1994 | Thompson . | |
| 5,375,579 | 12/1994 | Mukai . | |
| 5,386,812 | 2/1995 | Curran et al. . | |
| 5,390,645 | 2/1995 | Cook et al. . | |
| 5,408,866 | 4/1995 | Kawamura et al. . | |
| 5,427,076 | 6/1995 | Kobayashi et al. . | |
| 5,483,942 | 1/1996 | Perry et al. | 123/520 |
| 5,736,650 | 4/1998 | Hiron et al. | 73/861.63 |

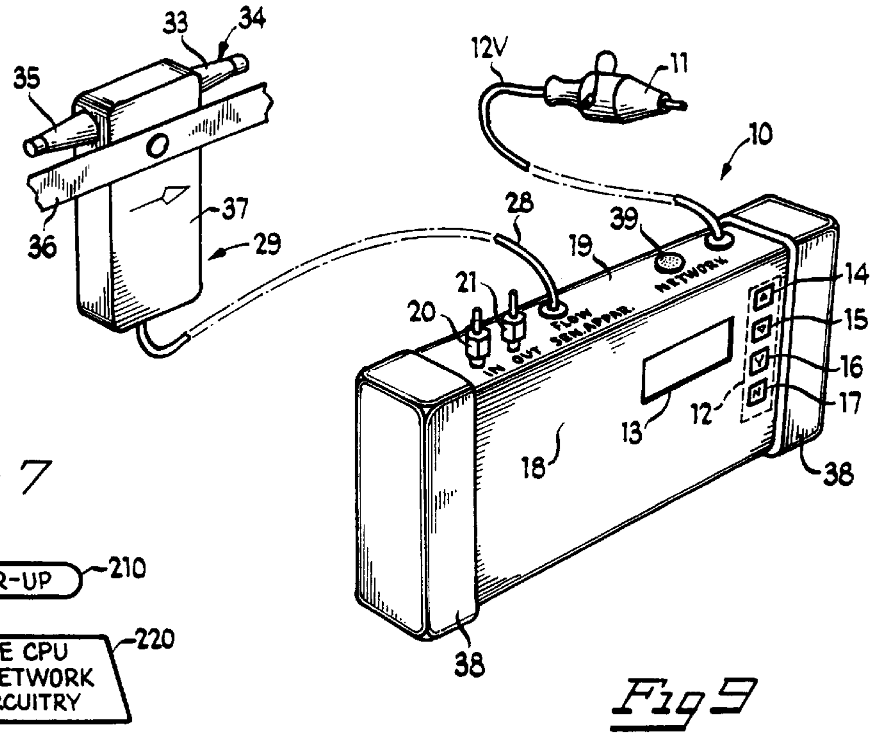
Fig 1
Fig 7
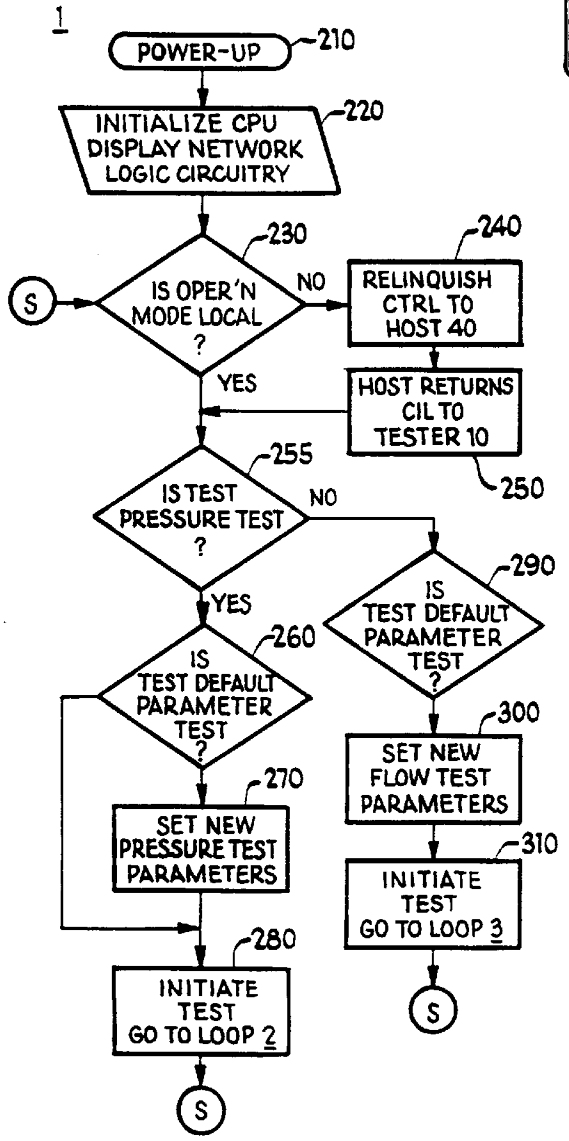
Fig 9
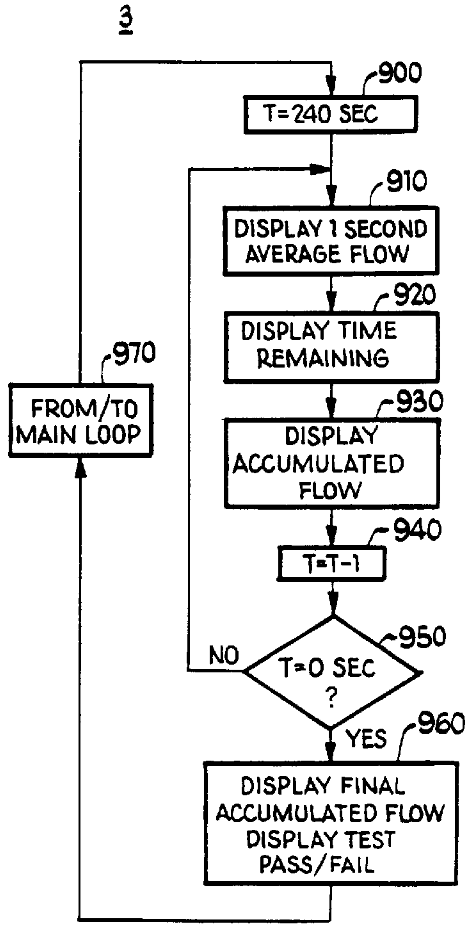

EVAPORATIVE EMISSION TESTER

This is a divisional of application Ser. No. 08/563,898, filed Nov. 22, 1995, now U.S. Pat. No 5,763,764, which is a continuation-in-part of application Ser. No. 08/369,481, filed Jan. 6, 1995, now abandoned.

BACKGROUND OF THE INVENTION

1. Field of the Invention

The present invention relates generally to a device and method for diagnosing an evaporative emission control system of an internal combustion engine.

2. Description of the Prior Art

The Environmental Protection Agency (EPA), in a cooperative effort with individual states, automobile manufacturers, manufacturers and contractors of test/diagnostic equipment, develops test procedures and related requirements for use in thoroughly diagnosing the emission systems of motor vehicles. The need for stricter emission system tests, as well as diagnostic instruments to implement such tests, is brought on by the promulgation of newly enacted environmental laws, both federal and state, relating to vehicle emissions. The test procedures and test equipment to be developed to perform the EPA tests reflect a desire by the EPA that sufficient safeguards be in place to prevent false failures, as well as a desire to see enough flexibility in the equipment specifications and quality control requirements to allow for innovative technical approaches to reduce overall costs. These tests are intended to identify a vehicle's true emissions as well as whether the vehicle needs emission repairs. If repairs are needed, the devices used for the tests can be used to ensure that the vehicles are repaired to be in conformance with the requirements.

Since 1971, fuel tanks on cars have been designed as part of a closed system in which vapors that evaporate from the gasoline in the tank are not released into the atmosphere. The system is called an evaporative emission control system and is sealed and under pressure, so that excess vapors are shunted to a charcoal canister known as the evaporative canister. Recent EPA rules require that vehicles pass a purge flow test of the evaporative canister as well as a test that monitors whether pressure in the system is maintained.

The evaporative system purge test is used to determine whether fuel vapor stored in the evaporative canister and present in the fuel tank are being properly drawn into the engine for combustion while the car is being driven. The evaporative emission system uses engine vacuum to draw fuel vapors in the fuel tank, and those temporarily stored in the evaporative canister and attached hoses, into the engine for combustion. The purge flow test determines whether this system is functioning properly by measuring the flow of vapors into a running engine. The pressure test, on the other hand, checks the system for leaks that would allow fuel vapors to escape into the atmosphere.

The purge flow test is generally conducted by driving the vehicle onto a dynamometer, activating vehicle restraints, positioning an exhaust collection device, and positioning an auxiliary engine cooling fan to simulate normal driving conditions. When the purge system is not working properly, the evaporative system can become plugged or perforated or disconnected, resulting in lack of flow to the intake manifold or leaking of hydrocarbons into the atmosphere. In addition to causing hydrocarbon emissions, failure of the purge flow system reduces fuel economy. During the purge flow test, purge flow is measured by simply inserting a flow sensor apparatus at one end of the hose that runs between the evaporative canister and the engine. At present time, EPA rules require that a vehicle have a minimum of 1 liter of flow during a 240-second test in order to pass. Most cars in proper working order will accumulate as much as 25 liters in a minute test cycle, and as much as 100-plus liters over a four-minute transient cycle. As soon as a vehicle exceeds 1 liter of flow, the purge test is complete.

The purge test requires a flow sensor apparatus that can measure the total flow observed over a given transient cycle. Additionally, hoses and universal fittings are required to hook up the flow sensor apparatus. Finally, a metering device is needed to control the test process, collect and record the data, and determine the pass/fail status.

The pressure test monitors for pressure leaks in the system. To check a system for leaks, the vapor lines to the fuel tank, and the fuel tank itself must be filled with nitrogen to a pressure of 14 inches of water (about 0.5 psi), in accordance with present EPA specifications. To pressurize these components, the inspector must locate the evaporative canister, remove the vapor line from the fuel tank near the canister, and hook up the pressure test equipment to the vapor line. After the system is filled, the pressure supply system is closed off, and the drop in pressure is observed. If the system pressure remains above eight inches of water after two minutes, the vehicle passes the test.

A source of nitrogen, a pressure gauge, a valve, and associated hoses and fittings are needed to perform the pressure test. In addition, a metering device is used to automatically meter the nitrogen, monitor the pressure, and collect and process the results. The EPA wants the pressure test performed in less than two minutes on most vehicles. Hence, algorithms must be developed to optimize the test so that a pass/fail decision can be made in less than two minutes.

A number of different devices have been developed to diagnose the purge flow and pressure systems of vehicles. Many of these devices are onboard evaporative emission control devices, permanently coupled to the engine's control module (ECM) to monitor system integrity.

One type of pressure test device is disclosed in U.S. Pat. No. 5,201,212 to Williams, relating to a line leak detector for detecting leaks in underground lines using pressurized nitrogen. A line supplies the pressurized nitrogen, at constant pressure, to the leak tester computation unit and instrument package that supplies the system under test through another line. Selected test system parameters are entered into the instrumentation package prior to running the test. The nitrogen pressure is applied and, during the test, the temperature of the tank and pressure is sampled and the leak rates are compensated for volumetric changes due to temperature.

Similarly, U.S. Pat. No. 5,086,403 to Slocum et al. discloses a microprocessor-based tester that measures the time rate of change of pressure to determine leaks. A leak detector is disclosed therein for a gasoline dispensing system and includes a central monitor and a test probe. The probe has a microprocessor and pressure transducer. The program of the microprocessor considers the pressure versus time signature of the pump system and can compensate for air in the lines and provide gross and precision tests for leaks.

U.S. Pat. No. 5,239,858 to Rogers et al. discloses a method and apparatus for automated testing of a vehicle fuel evaporation control system using an inert gas, such as helium. The system is tested by introducing the inert gas supplied from a cylinder through a pressure regulator and flow sensor apparatus to the fuel filler by use of a cap. The inert gas, helium, introduced to the fuel tank is vented through the system to the vehicle's evaporative canister where it is not absorbed, so it is vented out its perforated bottom and is sensed by a detector, confirming system integrity between the canister and the fuel tank. Starting the engine provides for the inert gas to be drawn from the canister into the engine. The absence of helium at the canister with the engine running would verify operation of the purge system. The helium drawn into the intake manifold would pass through the engine and catalytic converter, and appear in the tailpipe. The mass of helium exiting the tailpipe should equal the mass entering the system through a filler line. Any loss represents leakage in the system.

Conventional pressure testers, such as those described above, depend on constant flow pressurization techniques which are fundamentally inadequate for two reasons. First, a pressurizing scheme based on constant flow pressurization takes a prohibitively long time to perform. Second, the use of a constant flow pressurization technique does not lend itself to practical application in pressure testing of an evaporative emission control system. The high level pressurization requirements, as defined by EPA specifications, demand nitrogen pressurization to levels as high as 0.5 psi in a very short time frame.

Likewise, conventional purge testers operate to detect the proper functioning of a vehicle purge system as accomplished at various time intervals and at known rates of flow. To date, none of the modern-day purge testers are capable of measuring rates of fuel flow in the range of zero to 60 liters/minute as required by the EPA.

The EPA now requires that purge flow be detected for values as low as 1 liter over a four minute time cycle. This is equivalent to an average flow rate of 0.25 liters/minute. Conventional purge flow testers are incapable of measuring fuel vapor flow rate at such low levels.

Furthermore, there has never been a single, self-contained, portable, evaporative emission tester capable of performing both purge flow and pressure testing.

SUMMARY OF THE INVENTION

It is a general object of the present invention to provide a highly accurate evaporative emission tester which is economical and easy to use.

It is another object of the present invention to provide an evaporative emission tester which can monitor the operation of a vehicle's evaporative canister purge system and can verify that the system passes a transient test over a predetermined time interval.

It is a further object of the present invention to provide an evaporative emission tester that measures the amount of evaporative canister purge flow, in liters per minute, through the evaporative system over time and totalizes the quantity of flow after a driving cycle to determine if the purge system operates to minimum specifications; and which measurements can include flow rates as low as 0.25 liters/minute of fuel vapor flow.

Another object of the present invention is to provide an evaporative emission tester and method of operation associated therewith, for controlling and monitoring a pressure test of a vehicle's evaporative canister purge system, including all fuel lines and the fuel tank, over time to determine if the purge system leaks compared to test required presets.

It is another object of the present invention to provide an emission tester that functions as a stand-alone product or as an integrated product with a host computer/engine analyzer.

It is another object of the present invention to provide an evaporative emission tester and method of operation associated therewith, for controlling and monitoring a pressure test of a vehicle's gas cap, over time to determine if the gas cap leaks.

It is yet another object of the present invention to provide an evaporative emission tester usable by a technician for performing both a purge flow test and a pressure test therewith.

These and other features of the invention are attained by providing an evaporative emission tester for evaluating the integrity of an evaporative emission control system, which system includes an evaporative canister which stores fuel vapors from a fuel tank for drawing to an intake manifold of an internal combustion engine. The tester includes a flow sensor apparatus having a venturi provided with an inlet region and a constricted region coupled in series between the canister and the intake manifold, and further includes a differential pressure sensor pneumatically coupled to the inlet and constricted regions of the venturi for generating a differential pressure indicating signal. A signal processing circuit coupled to the sensor generates a fuel vapor flow rate signal, the value of which is a function of the differential pressure indicating signal. The venturi is dimensioned and arranged for measuring flow rates at least as low as 0.25 liters/minute, of fuel vapor flow.

A method is also provided for leakage testing a pressurized closed system. The method includes the steps of pressurizing the closed system using a puff pressurization scheme by activating and deactivating a pressurizing assembly a recurring number of times over a pressurization period. Pressure levels in the closed system are monitored each time the pressurizing assembly is deactivated to determine when a given pressure level is reached. Finally, the pressure level in the closed system is compared after a predetermined period of time to a minimum allowable pass-test value. During the pressurizing step, the system is pressurized at first activation/deactivation intervals and then at second activation/deactivation intervals, smaller than the first activation/deactivation intervals, to avoid pressurization overshoot.

Additionally, an evaporative emission tester is provided for performing both a purge flow test and a pressure test of an evaporative emission system. The tester includes a flow sensor apparatus having a venturi coupled to the emission system for measuring fuel vapor flow rate through the venturi and generating differential pressure indicating signals indicative of the flow rate. A gas supplying solenoid assembly responsive to a solenoid control signal is also included for pressurizing the system to a predetermined level, and includes a pressure sensor for monitoring the pressure level in the system. A pressurizing assembly intermittently pressurizes the system at first activation/deactivation intervals and then at second activation/deactivation intervals, smaller than the first activation/deactivation intervals, to avoid pressurization overshoot. A pass-fail determining circuit is responsive to either the differential pressure indicating signals or to signals monitored by the pressure sensor to test the integrity of the emission system.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a front and top perspective view of an evaporative emission (EVAP) tester constructed in accordance with and embodying the features of the present invention;

FIG. 7 is an operational flow diagram of a MAIN LOOP routine for initializing the EVAP tester of FIG. 1 to perform one of either a purge flow test or a pressure test;

FIG. 9 is an operational flow diagram corresponding to the PURGE FLOW routine illustrating the steps for performing a purge flow test and displaying the results.

DETAILED DESCRIPTION OF THE PREFERRED EMBODIMENTS

Figure 2:
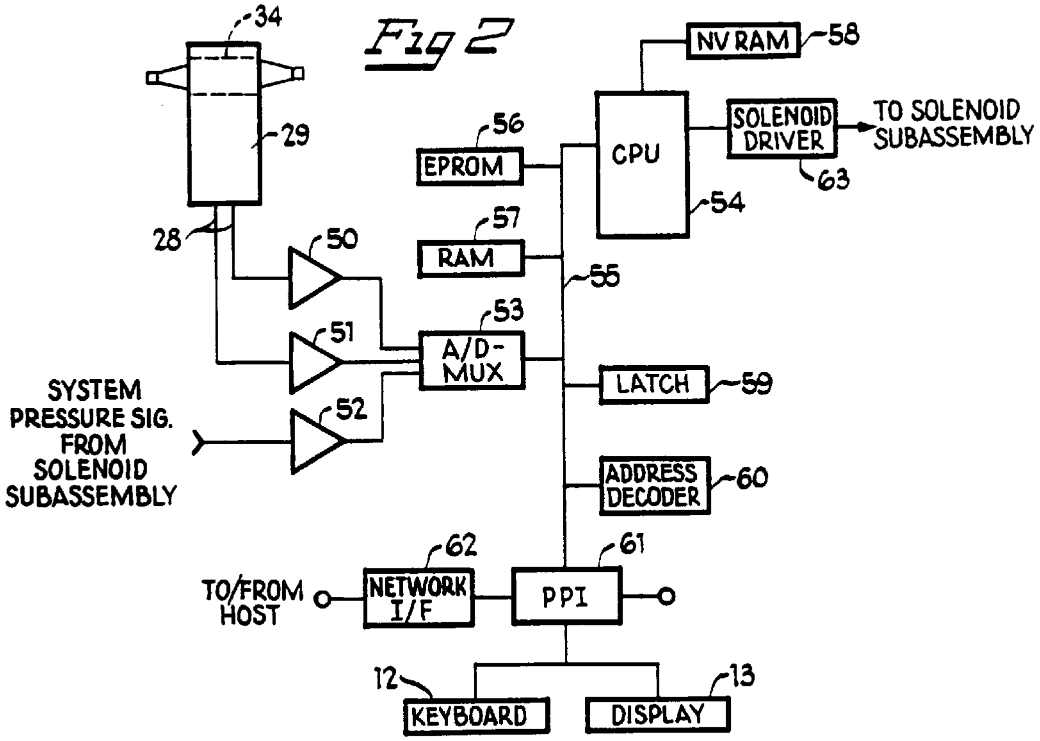
FIG. 2 is a functional block diagram of the electronic circuitry embodied in the EVAP tester shown in FIG. 1.

Turning now to the drawings, and more particularly FIG. 1 thereof, there is depicted an evaporative emission tester (EVAP tester) 10 incorporating the features of the invention, for performing purge flow and pressure testing on an evaporative pressure system of an internal combustion engine. EVAP tester 10 is a portable unit which operates on standard 12-volt battery power and is provided with a 12-volt car battery adapter 11, of the type which can be plugged into a cigarette lighter. EVAP tester 10 includes a four-key membrane switch keypad 12 and a liquid crystal display 13 for displaying information and/or data in four lines of twenty characters each. A cursor arrow (→) in the display shows the action available for menu selection, using the UP arrow (↑) key 14 and the DOWN arrow (↓) key 15, together with the YES ("Y") key 16 or the NO ("N") key 17 to accept or reject, confirm or cancel, or allow to continue or exit.

Figure 6:
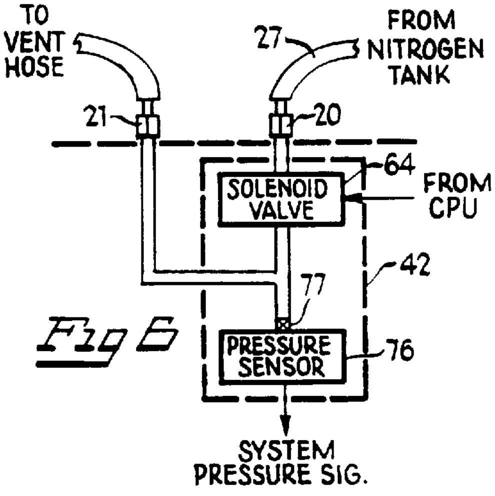
FIG. 6 is a partially functional block diagram and partially vertical sectional view of a solenoid subassembly and associated hoses and fittings included with the EVAP tester of FIG. 1 for performing a pressure test.

The electronic circuits of the EVAP tester 10, which are shown in block diagram form in FIG. 2, are enclosed within a housing 18. On a top surface 19 of the housing 18 are IN and OUT fittings, 20 and 21, respectively, used during a pressure test mode of operation, to be described below in greater detail in connection with FIGS. 6 and 8.

Figure 3:
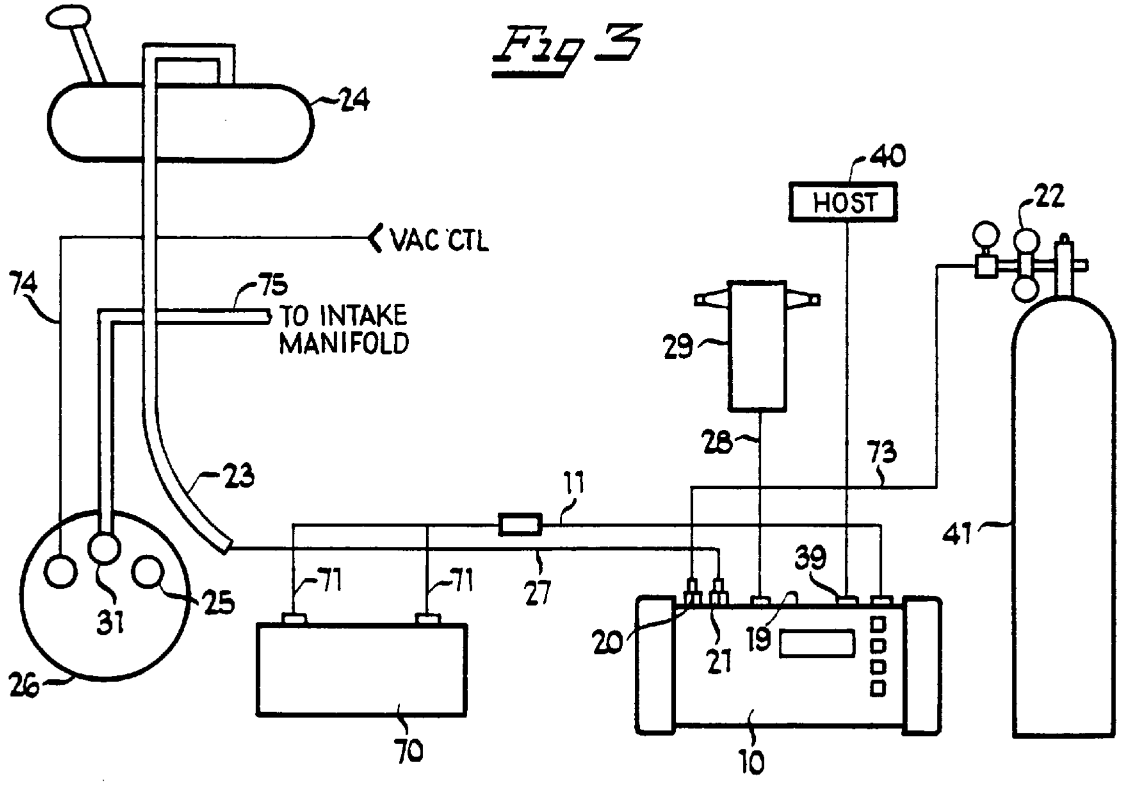
FIG. 3 is a diagram showing the manner of connecting the EVAP tester of FIG. 1 to an evaporative emission control system of a vehicle for performing a pressure test.

As is shown more clearly in FIG. 3, the IN fitting 20 is the pressure-in connection from a nitrogen tank pressure regulator and gauge assembly 22. The OUT fitting 21 is the pressure-out connection to the vent hose 23 of a fuel tank 24. The vent hose 23 is normally connected to the receiving lead 25 of an evaporative charcoal canister 26. For coupling to the tester 10, the vent hose 23 is disconnected from the canister 26 and is coupled to the tapered end of hose 27 provided with EVAP tester 10 to aid connection of the fitting 21 to a variety of vent hose 23 sizes.

Also included on top surface 19 is a flow sensor apparatus cable 28 connected to a flow sensor apparatus 29, which communicates absolute-pressure and differential-pressure indicating electrical signals to the EVAP tester 10 electronic circuitry, shown more clearly in FIG. 2. The flow sensor apparatus 29 is part of the present invention and is an integral component of the EVAP tester 10. The flow sensor apparatus 29 is used during the purge flow test mode of operation, to be described below in connection with FIGS. 5A, 5B and 9.

Figure 4:
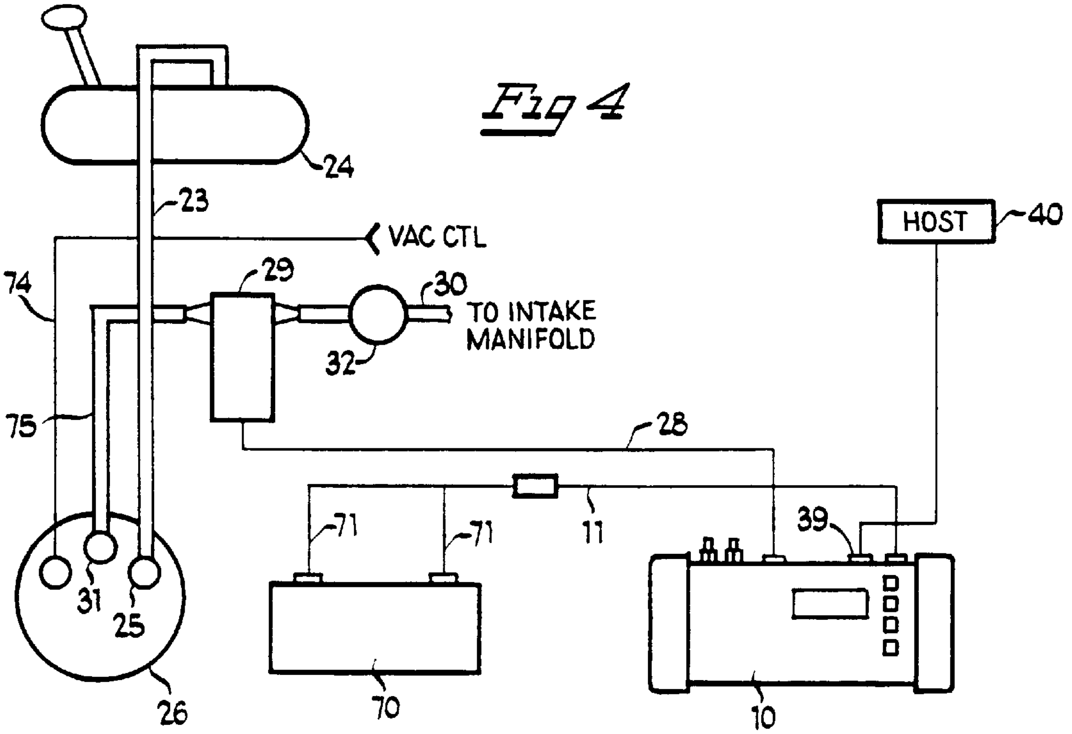
FIG. 4 is similar to FIG. 3, but instead shows the EVAP tester as connected during a purge flow test.

As shown more clearly in FIG. 4, the flow sensor apparatus 29 is installed in series with the vehicle's purge line 30 and the purge port 31 of the charcoal canister 26. If the vehicle has a purge control solenoid 32 mounted in the purge line 30, the flow sensor apparatus 29 may be installed before or after the solenoid 32. In the preferred arrangement, the flow sensor apparatus 29 is connected upstream of the solenoid 32. The flow sensor apparatus 29 has a direction arrow (see FIG. 1) to indicate the tapered outlet fitting 33 of a specially constructed venturi pickup assembly 34 (see FIGS. 5A, 5B) included therein that must be connected to the purge line 30 that leads to the vehicle's intake manifold vacuum source; an inlet fitting 35 connects to a hose connected to the purge port 31 of canister 26. A velcro strap 36 (see FIG. 1) is riveted to the housing 37 of flow sensor apparatus 29 to aid in supporting the flow sensor apparatus 29, if desired.

Referring back to FIG. 1, housing 18 of EVAP tester 10 includes, on opposite sides thereof, hand-grips 38 made of rubber material or the like. A network communication port 39 is also provided for optional master-slave communication of the EVAP tester 10 to a host computer 40 (FIGS. 3 and 4). It is envisioned that when the EVAP tester is selected for operation in slave mode, the host computer 40 replaces local control by the EVAP tester. In that event, system test parameters and program control are passed from the host as a master, with the EVAP tester functioning as a slave terminal. Control by a host/master of a number of EVAP testers connected for optional operation in slave mode is well known in the art, requiring only that an application-specific protocol be incorporated therewith, and will not be described in greater detail. Operation between local and slave mode, and between pressure test and purge flow test modes, is entirely under program control (see MAIN LOOP routine 1 in FIG. 7).

When EVAP tester 10 is configured for operation in pressure test mode, either under local control or under host computer 40 networked control, an evaporative system integrity test is conducted that confirms whether vapor leaks between the fuel tank 24 and the charcoal canister 26 exist. Referring to FIG. 3, the pressure regulator and gauge assembly 22 are connected to a supply tank 41 of a suitable pressurized gas, such as nitrogen. Assembly 22 allows the pressure in tank 41 to be monitored to supply regulated pressure to the EVAP tester 10 for pressure testing. IN and OUT fittings 20 and 21 are connected to a solenoid subassembly 42 (FIG. 6), internal to the housing 18 of EVAP tester 10. The solenoid subassembly 42, under program control, generates a system pressure signal indicative of the pressure in the fuel tank 24 and vent hose 23 as the fuel tank system is pressurized just prior to testing. This system pressure signal is monitored by the electronic circuitry in the housing 18 (see FIG. 2), and by a corresponding PRESSURE TEST software routine 2 operating in the background (see FIG. 8), to control pressurization by the solenoid subassembly 42.

Alternatively, when EVAP tester 10 is configured for operation in the purge flow mode, the amount of fuel vapor drawn through the charcoal canister 26 into the intake manifold of the engine during normal driving conditions is measured. The purpose is to ensure the proper purging of the evaporative emission control system. For this purpose, the venturi pickup assembly 34, shown in FIG. 5A, generates a differential pressure signal and an absolute pressure signal, the combined values of which are indicative of the rate of fuel flow to the purge line 30 from charcoal canister 26. The differential and absolute pressure signals are communicated via cable 28 to, and monitored by, the electronic circuitry in the housing 18 (see FIG. 2), in accordance with a PURGE FLOW TEST software routine 3 operating in the background (see FIG. 9), for a predetermined transient driving cycle.

Referring to FIG. 2, the electronic circuits of the EVAP tester 10 will now be explained. The differential and absolute pressure signals from cable 28 and the system pressure signal from solenoid assembly 42 are fed as analog inputs to amplifiers 50, 51, and 52 respectively. These analog signals are then input to an analog-to-digital converter/integral multiplexer integrated circuit (A/D converter) 53, of the type generally known as MAX-182. The digitized output of A/D converter 53 is then communicated to a CPU 54 via a system bus 55. CPU 54 is a microprocessor circuit of the type generally known as an 80C31 microcontroller operating in conjunction with a program stored in EPROM 56. RAM 57 is used for volatile buffer storage during testing. A non-volatile RAM 58 is used for optional storage of custom pressure test parameters. Address information is stored in an address latch 59 and memory-mapped device address decoding is implemented by an address decoder a circuit 60. A programmable peripheral interface (PPI) 61 connects the display 13, keyboard 12, and associated logic circuitry to the system bus 55 for communication thereto. PPI 61 also network interfaces the EVAP tester 10 to the system bus 55 via a network interface circuit 62. In the preferred construction, the network interface 62 is of the type generally designated as a 3120 Motorola Neuron integrated circuit. A high current solenoid interface 63 is used to connect CPU 54 to the solenoid valve 64 in the solenoid pickup assembly 42 shown in FIG. 6, to control tank pressurization in the manner to be described below in connection with PRESSURE TEST routine 2 shown in FIG. 8. Not shown is power supply circuitry which converts the 12 V input power to 5 volts to power the digital logic circuitry and to +/−15 V to power the analog circuitry, all in a known manner.

The pressure test is automatic and is performed with the engine not running during the pressure test mode of operation of EVAP tester 10. In accordance with EPA specifications, an evaporative emission control system will pass the test when a pressure above 8 inches WC (water column) is successfully maintained for two minutes after being pressurized initially to 14" WC (0.5 psi).

To perform the test, a technician must carry out a series of steps. First, the technician must locate the appropriate charcoal canister 26 hoses then connect the EVAP tester 10 to the vehicle. For pressure testing, the EVAP tester 10 is connected as shown in FIG. 3. A 12 V battery 70 is connected to the 12 V battery adapter 11 using a set of adapter plugs 71. When parameter selection is performed under host computer 40 control (slave mode), then the host computer 40 must be connected to the network communication port 39. The OUT fitting 21 is connected as described previously to the vent hose 23 via hose 27. The IN fitting 20 is connected via a hose 73 to the pressure regulator and gauge assembly 22 which, in turn, is connected to the nitrogen supply tank 41. For this test, the flow sensor apparatus 29 is not used.

Also shown are vacuum control line 74 and a hose 75 extending from the purge port 31 of the charcoal canister 26. These are normally connected in the vehicle and should remain connected during the pressure test. The IN and OUT fittings are connected to the solenoid subassembly 42 shown in FIG. 6. Included in the solenoid subassembly 42 is a low pressure sensor 76, of the type generally designated as Model 5552 transducer manufactured by Silicon Microstructures, Inc., for generating a pressure indicating signal in response to any given pressure level detected at its pneumatic inlet 77. The CPU 54 controls system pressurization by repeatedly activating/deactivating (on/off) the solenoid valve 64 while simultaneously monitoring system pressure by way of the pressure indicating signal communicated to it from pressure sensor 76. The operating flow diagram of the CPU 54 program-performed steps, in pressure test mode, will be described below in connection with FIG. 8.

The purge flow test is also automatic and is performed during a transient driving cycle in the purge flow test mode of operation of EVAP tester 10. As previously explained, the purpose of this test is to ensure the proper purging of the evaporative emission control system. For this procedure, the flow sensor apparatus 29 is inserted in-line (see FIG. 4) with the purge hose 75 from charcoal canister 26 and the purge line 30 going to the intake manifold (not shown) and nearer to the canister 26 whenever possible. Again in accordance with EPA specifications, the test successfully checks for a minimum flow of 1.0 standard liter of fuel vapor during a transient 240 second (4-minute) driving cycle (not by instantaneous flow rate) or a 240 second time period while on a road test. The default parameters of 1.0 liter of fuel vapor and the 240-second period driving cycle are factory preset. Customized parameters may, however, additionally be entered by the technician to perform fault-isolation type repair tests instead. Technician customized parameter entry optionally makes it feasible for the technician to change the factory preset (default) parameters when the EPA changes its required pressure and flow test specifications, without having to return the EVAP tester 10 to the manufacturer for reprogramming.

During purge flow testing, the system purge flow is monitored, the results totaled, and a pass/fail decision made. The test sequence is initiated when the transient driving cycle is started and is terminated, or can be terminated, either when the driving cycle is completed or as soon as the system exceeds the specified flow parameter, e.g., one liter of flow.

When the test is performed taking the tester on a road test with the vehicle, the data acquired can confirm that the purge test would or would not pass, as compared to if the test was performed with the vehicle on a chassis dynamometer during the transient driving cycle.

Figure 5A:
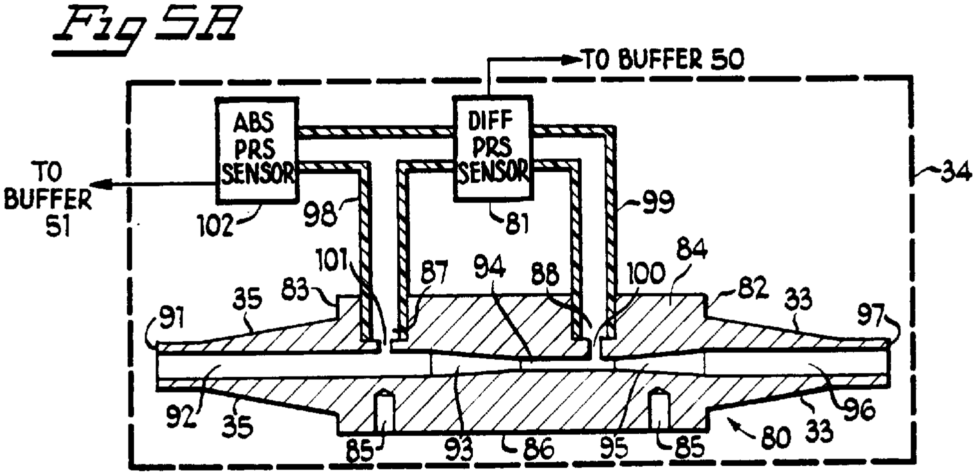
FIG. 5A is a partially functional block diagram and partially vertical sectional view of a venturi pickup assembly of a flow sensor apparatus included with the EVAP tester of FIG. 1 for performing a purge flow test.
Figure 5B:
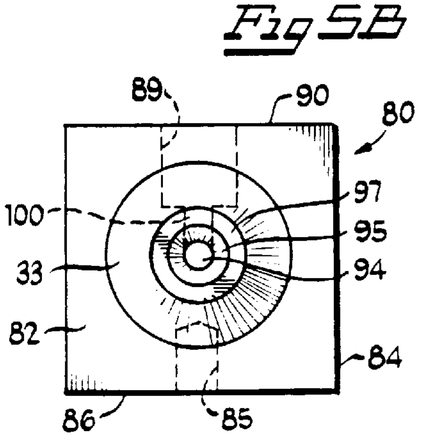
FIG. 5B is an end elevation view of the venturi shown in FIG. 5B as viewed from the right-hand end thereof.

During a purge flow test, the venturi pickup assembly 34, confined within flow sensor apparatus housing 37, monitors the flow of fuel vapor through a variable diameter orifice of a venturi 80 (see FIGS. 5A and 5B). Venturi 80 is specially dimensioned to allow a differential pressure sensor 81 coupled thereto to generate differential pressure signals, over a transient driving cycle, indicative of vapor flow rate through the venturi 80 at a given point in time. The dimensioning of the venturi 80 permits flow rate measurements as sensitive as 0.25 liters/min. In this regard, a vehicle's purge flow system under test exhibiting a detected cumulative purge flow of one liter (over a 240 second time cycle) would pass the test.

The venturi fittings 35 and 33 connect to the purge hose 75 and purge line 30, respectively, as previously explained. These fittings 33, 35 have frustoconical outer surfaces and extend outwardly from opposing flat surfaces 82 and 83, respectively, of a rectangular body 84. Screw threads 85 are formed in a bottom surface 86 of venturi body 84 to aid in its coupling to the flow sensor apparatus housing 37. An inlet-region tap 87 and a central-region tap 88 extend downwardly from a top surface 90 of venturi body 84.

A passage is formed axially through the center of the venturi 80, and includes several regions. Extending inwardly from end outer surface 91 on fitting 35, is an inlet cylindrical region 92 of fixed diameter which leads coaxially into the wide end of a frustoconical region 93, the narrow end of which communicates coaxially with one end of a cylindrical central region 94. The opposite end of the region 94 communicates coaxially with the narrow end of a second frustoconical region 95, the wide end of which communicates coaxially with one end of an outlet cylindrical region 96, the diameter of which is substantially equal in size to that of the inlet cylindrical region 92. The outlet region 96 extends to an end surface 97 on the fitting 33.

The above-described venturi passage regions 92, 93, 94, 95 and 96 are appropriately dimensioned to provide differential pressure to the differential pressure sensor 81. The sensor 81 is connected to the venturi 80 by way of a pair of friction-fitted pneumatic-feed hoses 98 and 99 running from inlet-region tap 87 and central region tap 88 to associated source connections on the differential pressure sensor 81.

Cylindrical bores 100 and 101 provide a pneumatic connection of inlet- and central region taps 87, 88 with inlet cylindrical region 92 and central region 94, respectively. The tapped positions of inlet- and central region taps 87, 88 is shown for optimal differential pressure detection by sensor 81.

In the preferred construction, venturi 80 can provide differential pressures in the range of zero to 1.5 psi. The construction of the venturi is given by the text book formula:

$$Q=\dot{m}/\rho_2, \text{ standard flow equation} \quad (1)$$

$$\dot{m}=C_d\rho_2 A_2 v_2, \text{ (see text: Roberson/Crowe-Equation 13–16)} \quad (2)$$

for high $R_e$ (as in our case), $C_d=1$ $$v_2=[(2K(K-1))(P_1/\rho_1)(1-(P_2/P_1)^{(K-1/K)}/(1-(P_2/P_1)^{(2/K)}(D_2/D_1)^4]^{1/3}, \quad (3)$$

from Roberson/Crowe-Equation 13–15

$$Q=A_2[((2K(K-1))(P_1/\rho_1)(1-(P_2/P_1)^{(K-1/K)})/(1-(P_2/P_1)^{(2/K)})(D_2/D_1)^4]^{1/2}, \quad (4)$$

where $\rho_1=P_1/RT_1$ by definition

Variables $D_1$=inlet diameter $D_2$=neck diameter $P_1$=inlet pressure $P_2$=neck pressure $A_2$=neck area $T_2$=neck temperature $\rho_2$=neck air density $v_2$=neck air velocity $\dot{m}$=mass air flow $C_d$=discharge coefficient $R_e$=Reynolds number K=ratio of specific heats k=flow coefficient Q=volumetric flow rate R=Universal Gas Constant ν=kinematic viscosity $T_1$=inlet temperature $\rho_1$=inlet density substituting the following values into (4), $D_1=0.004$ (m)

$D_2=0.002$ (m)

K=1.40 (from Roberson/Crowe-Table A-2)

R=287 (J/(kg·° K))

$A_2=(0.001)^2\pi$ ($m^2$)

$R_e=4Q/\pi D_x \nu$, where $D_x$ is $D_1$, $D_2$

—in our case $R_e=6\times10^7$

—from the chart in FIG. 13-11 of Roberson/Crowe and an estimation of $D_2/D_1=0.5$, we get $k=1.02\approx1$ we get $$Q=231.40[(1-(P_2/P_1)^{0.29})/(1-(P_2/P_1)^{1.4286})]^{1/2}$$

where Q is in liters/minute.

This formula is set forth in a text entitled Engineering Fluid Dynamics, by Robertson and Crowe, published by Houghton Mifflin Co., 1985, 3rd ed., pp. 525, 536–540, 696, which describes general principles on fluid dynamics and, more particularly, venturi fluid flow and pressure differentials. To the extent the text aids in the understanding of the fluid dynamics of the venturi 80 as used in the present invention, it is incorporated herein by reference.

The differential pressure sensor 81 generates an electrical differential pressure signal representative of volumetric fuel flow rate. To compensate for deviations in volumetric differential flow measurements over a varying range of absolute pressures, an absolute pressure sensor 102 (see FIG. 5A) is also provided, which monitors the pressure level at the pneumatic-feed hose 98 coupled to the inlet-region tap 87. The absolute pressure sensor 102, in turn, generates an absolute pressure signal which, together with the differential pressure signal, are communicated to the CPU 54.

As is well known, the true rate of fuel flow can be easily derived from known correlative values for absolute and differential pressure signal parameters. In the preferred constructional embodiment, a correlational look-up table is stored in memory and is addressable by the electronic circuitry on the basis of the value of the received signals. The look-up table value associated with the received signals corresponds to the true flow rate at the point of measurement. The retrieved look-up table value is then transmitted to the display 13. As should be readily apparent, the use of an address-decodable look-up table obviates the need for integration and like numerical computation hardware and/or complicated software processing routines.

The differential pressure and absolute pressure sensors 81 and 102 are generally of the type known as MPX50I0DP and MPX4100AP, respectively, commercially available from Motorola, and are configured in the manner suggested in the respective data sheets for each sensor.

The general operational flow diagram of the CPU 54 program-performed steps, in connection with the purge flow test, will be described below in connection with FIG. 9.

Referring now to FIG. 7, an operational flow diagram is provided showing generally the initialization procedures of the EVAP tester 10. At power up, a first portion of the program stored in memory initializes the registers and ports of the CPU 54, then initializes the display and network logic circuitry (210, 220). The program then puts a hello screen on the display 13 and sits in a short loop waiting for a front panel pushbutton activation (230); or a command from the remote host computer 40 over the network, if the EVAP tester 10 is to be used in slave mode (240). If a command from the network is received, the EVAP tester 10 goes into slave mode, ignoring all input from pushbuttons 14–17 until returned to local mode (250) by the host. Whether operating in local mode or in slave mode, the tester 10 must be apprised of all parameters necessary to operate in the appropriate mode, including whether the selected test mode is going to be the pressure test mode (pressure testing) or the purge flow mode (purge flow testing) (255).

When the selected mode requires pressure testing the evaporative emission control system, the tester 10 will initially quiz the operator as to whether the test is going to be a canned pressure test involving predetermined default parameters (such as may be stored in non-volatile RAM 58) (260) or whether the operator intends to provide new parameters (270). It is envisioned that allowing the operator to change the default parameters, i.e., pressurization and test-time parameters, permits the operator to perform repair analysis on the evaporative system, in addition to merely using the tester 10 to determine whether the system passes a specific test of predetermined test parameters.

Figure 8:
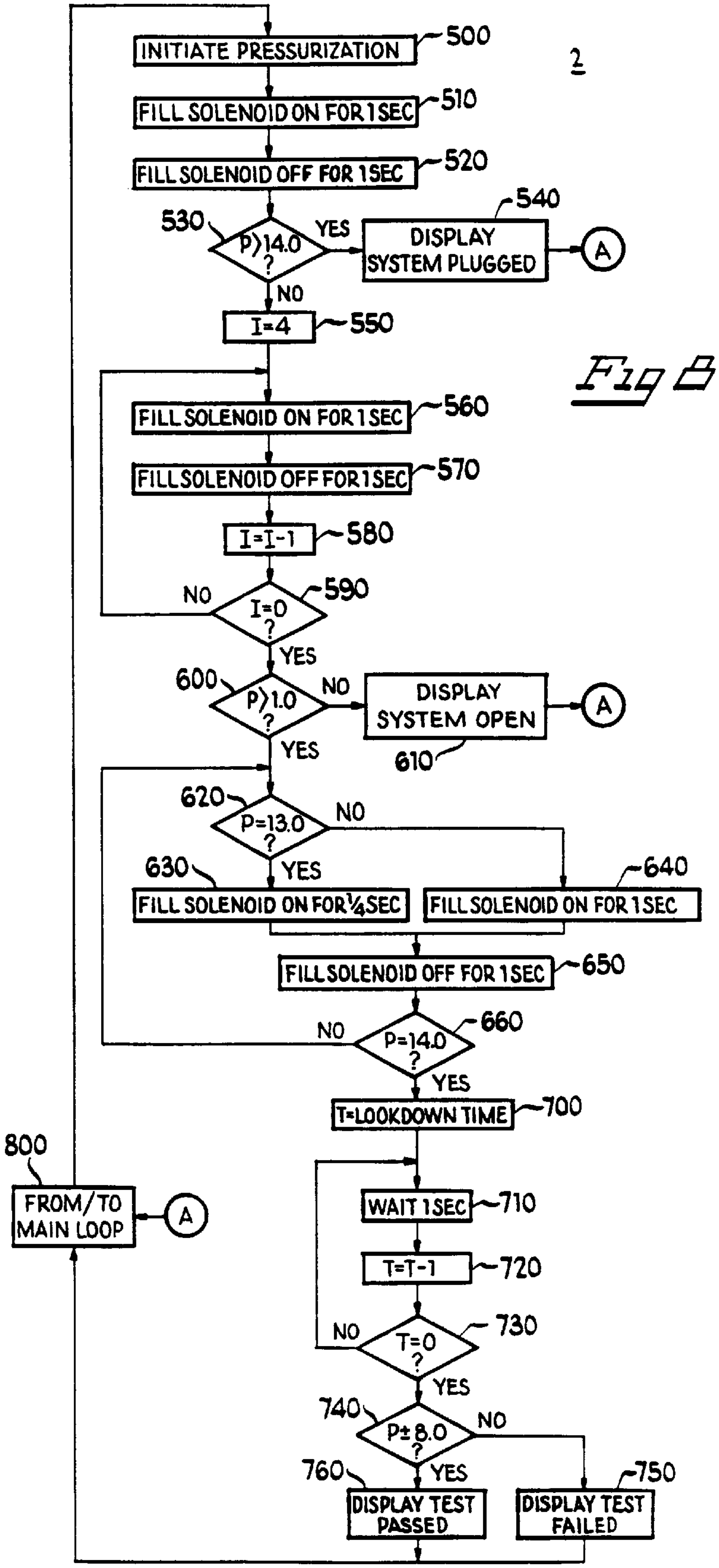
FIG. 8 is an operational flow diagram corresponding to the PRESSURE TEST routine illustrating the steps for performing a pressure test and displaying the results.

Once pressure test parameters are sufficiently defined, program control jumps automatically from the MAIN LOOP routine 1 (280) to a PRESSURE TEST routine 2, the flow diagram for which is shown in FIG. 8.

1. Pressure Tests.

For purposes of explanation, the PRESSURE TEST routine 2 of FIG. 8 will be described in connection with the following test parameters: 14" WC tank pressure, a 1" WC minimum pressure at the end of 5 pressurization cycles to check for a SYSTEM-OPEN condition, a 120-second leakdown time, and an 8" WC minimum pressure at the end of the test. The test consists of a pressurization phase (500 et seq.) and a leakdown phase (700 et seq.). During pressurization, the pressure supply solenoid valve 64 is actuated for one second, and then deactivated for one second to allow the system to equalize (510, 520). Short bursts of high pressure nitrogen (e.g., 30 p.s.i. or greater) are 'puffed' into the system from nitrogen tank 41 during the period the supply solenoid valve 64 is activated. At the end of the equalizing period, the tank pressure is measured by pressure sensor 76, and a decision (530) is made on what to do next. If the-pressure is above the set point (S.P.=14" f WC) at the end of the first cycle, the system is assumed to be plugged and the test is aborted (540). If the pressure is below the set point, puff pressurization is resumed. If the pressure does not exceed 1" WC by the end of a predetermined number of additional pressurization cycles (I), where in the preferred embodiment I=4 (550–600), the system is assumed to be open, and the test is aborted (610). When the pressure reaches 1" WC below the set point (i.e., S.P.=13" WC), the puffing cycle changes to ¼ second on and 1 second off to minimize overshooting the final set point measure (620–660).

The puffing pressurization scheme described above provides a very quick and safe way to pressurize the evaporative system with negligible pressure set point overshoot.

After the tank is pressurized, the leakdown phase starts (700). The tester 10 starts a timer (set for 120 seconds in the exemplary embodiment or to whatever custom parameter is otherwise set by the operator) and waits for the timer to run down (710–740). At the expiration of the leakdown timer, the final pressure is measured. If the test is below the exemplary 8" WC, a "TEST FAILED" screen is put up (750). Otherwise, a "TEST PASSED" screen is put up (760). When the test is a custom test, the final pressure is reported and the operator is left to make the pass/fail decision. At pressure test completion, program control jumps back to the MAIN LOOP routine 1 (800).

Referring back to the MAIN LOOP routine 1 of FIG. 7, when the selected mode requires purge flow testing the evaporative emission control system, the tester 10 will similarly quiz the operator as to whether the test is a canned purge flow test, involving predetermined default parameters (such as may be stored in non-volatile RAM 58) (290), or whether the operator intends to provide new purge flow parameters (300). As in pressure test mode described above, allowing the operator to set custom parameters facilitates use of the tester for repair analysis and the like.

Once purge flow test parameters are sufficiently defined, program control jumps automatically from the MAIN LOOP routine 1 (310) to a PURGE FLOW TEST routine 3, the flow diagram for which is shown in FIG. 9.

2. Flow Test.

For purposes of explanation, the PURGE FLOW TEST routine 3 of FIG. 9 will conduct a flow test that measures the flow and accumulates the total flow over a 240-second interval (900 et seq.). In this regard, the average flow rate (litersminute) over the last second (910), the accumulated total flow (liters) (920), and the time remaining in the test (930) are put up on the display during the test. Flow measurement signals are provided from the venturi pickup assembly 34 to the electronic circuitry of the tester 10 in the manner described above in connection with FIG. 5A. When the total flow is, for example, over one liter at the end of the test, a "TEST PASSED" screen is put up; otherwise, a "TEST FAILED" screen is displayed (960).

Optionally, the tester 10 may display for purge flow diagnostic purposes, the average flow rate over the last second and the average flow rate over the last 10 seconds. For this purpose, the time remaining display is superfluous. At purge test completion, program control jumps back to the MAIN LOOP routine 1 (970).

Figure 10:
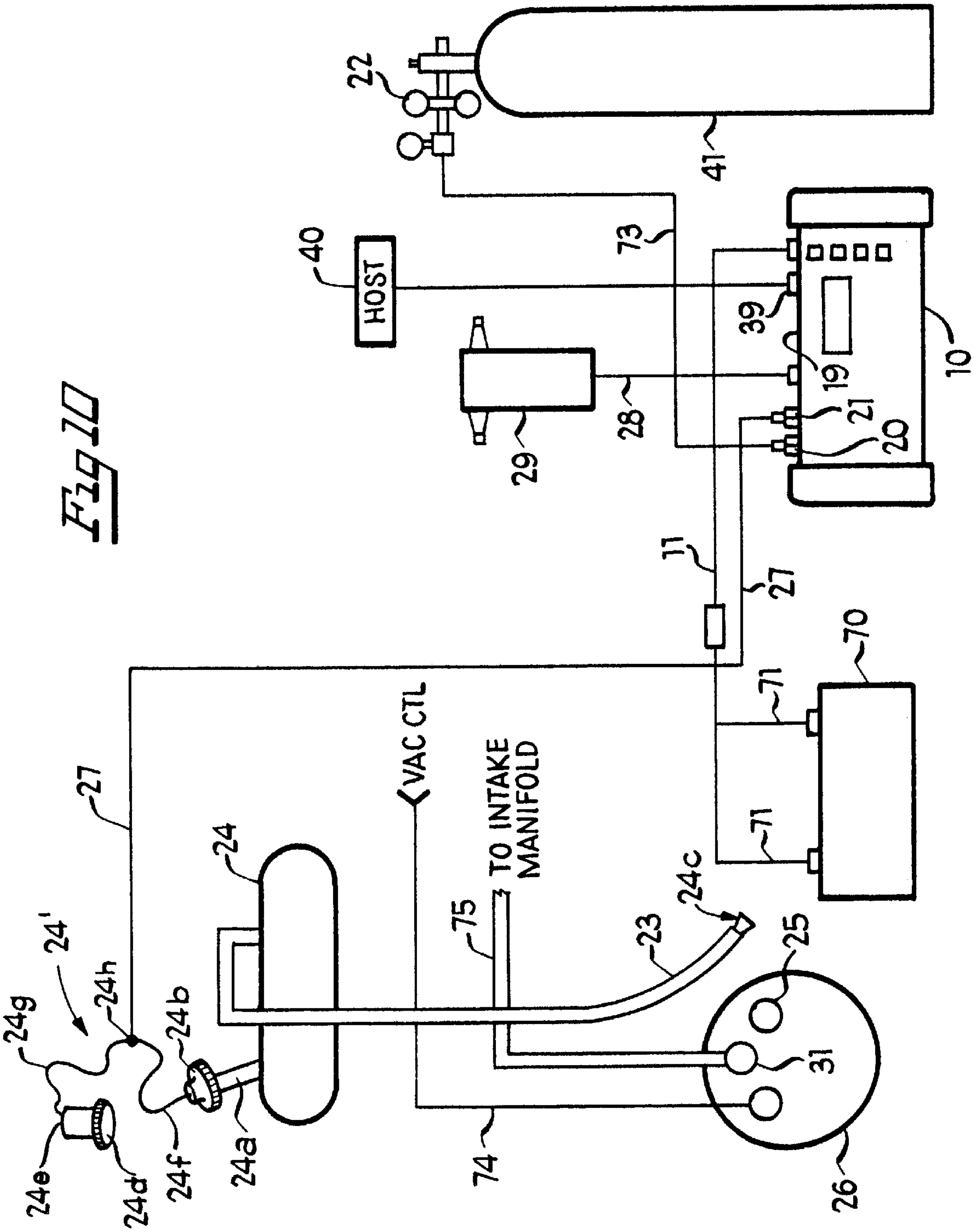
FIG. 10 is a diagram showing yet another manner of connecting the EVAP tester of FIG. 1 for performing a pressure test achieved using a specially provided fuel tank and cap tester kit.

It is also envisioned that the pressure test may be useful for a variety of related pressure critical applications of the evaporative emission control system. For example, the tester 10 may alternatively be used with a Fuel Tank and Cap Tester Kit 24', as shown in FIG. 10. The kit includes:

(a) a filler neck adapter 24*b* for pressurizing through the filler neck 24*a* of the fuel tanks 24 (requires plugging the vent hose 23 pneumatic outlet using a plug 24*c*);

(b) a gas cap tester 24*e* threadedly engageable with the gas cap 24*d* for testing the gas cap for leakage; and (c) two access needles 24*f* and 24*g*, joined by a tee connector 24*h*, for coupling the pressurizing hose 27 to the associated filler neck adapter 24*b* and gas cap tester 24*e*, respectively, with the opposite end of hose 27 connected to the OUT fitting 21 on the EVAP tester 10.

The kit 24' allows pressure testing the evaporative emission control system by pressurizing the system via the fuel tank filler neck 24*a* instead of the fuel tank vent hose 23. On some vehicles, the vent hose 23 is inconveniently located, making pressurization difficult. In such cases, pressurizing at the filler neck 24*a* is preferred. The filler neck pressure test can be conducted with the gas cap tester 24*e* connected to the gas cap 24*d*, in which case the integrity of the gas cap is simultaneously also tested for leakage. When a gas cap test is unnecessary, the gas cap access needle 24*g* on kit 24' must be pinched-off to prevent escape of the pressurizing gas which flows through filler neck access needle 24*f* to filler neck adapter 24*b* and to filler neck 24*a*, thus pressurizing only the tank.

The pressure test involves the same program control as the custom pressure test described above in connection with the PRESSURE TEST routine 2 of FIG. 8, regardless of whether the filler neck pressure test is to be conducted alone or together with the gas cap test.

The gas cap test cannot be conducted independently of the system pressure test because of pressure overshoot problems. In other words, a pressurized system must be of sufficient volume to make pressuring and de-pressurizing possible over a given test period. The small volume of the gas cap 24*a* and associated adapter 24*e* do not together have a sufficient volume to make pressuring the gas cap possible. However, by integrally connecting the gas cap to the closed system-under-test (the tank) using the kit 24', it becomes possible to test the gas cap 24*d* during the closed system test. To determine if a detected leak (test failed) is in the cap or in the tank, the operator is prompted to clamp the access needle 24*g* between the gas cap adapter 24*e* and the tee connector 24*h*, and to perform the pressure test a second time. If the pressure does not drop, the cap leaks and replacement is recommended, otherwise the evaporative emission control system leaks.

Because filler necks and gas caps come in a variety of sizes and shapes, it is envisioned that the commercial embodiment of the kit 24' would include adapters of varying sizes.

Alternatively, to test leakage of a gas cap, independent of the fuel tank and fuel lines, the gas cap may be removed therefrom and threaded onto a gas cap pressure vessel, which vessel would be coupled to the OUT fitting 21 on the tester 10 to be pressurized thereby. The operator will then enter the pressurization value, test time, and test pressure as during a normal custom pressure test described above. The gas cap pressure test would be performed in the same manner as the evaporative emission control system pressure test, with the exception that the system blockage program control steps in routine 2 would not be necessary.

For efficient results, the pressurization cycle time for the gas cap test may be performed with a ¼ second on and 1 second off puffing pressurization scheme, as provided in the exemplary operational flow diagram of FIG. 9 (see 630, 640). All other pressurization, timing and pressure test steps are done in exactly the same manner as in the evaporative system test. Hence, pressure should be checked during the "OFF" part of the cycle.

Since both purge flow testing and pressure testing involve the testing of closed systems, it is envisioned that the evaporative emission tester 10 of the present invention can be easily modified for use in any number of like environments.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An evaporative emission tester for evaluating an evaporative emission control system, which system includes an evaporative canister which stores fuel vapors from a fuel tank for drawing to an intake manifold of an internal combustion engine, the tester comprising:

a flow sensor apparatus including a venturi having an inlet region and a constricted region coupled in series between the canister and the intake manifold, and further including a differential pressure sensor pneumatically coupled to the inlet and constricted regions of said venturi for generating a differential pressure indicating signal and an absolute pressure sensor pneumatically coupled to the inlet region of said venturi for generating an absolute pressure signal; and signal processing means coupled to said differential pressure sensor and to said absolute pressure sensor for generating a fuel vapor flow rate signal having a value which is a function of the differential pressure indicating signal and the absolute pressure indicating signal.

2. The evaporative emission tester of claim 1, wherein said venturi is dimensioned and arranged for measuring flow rates at least as low as 0.25 liters/minute of fuel vapor flow.

3. The evaporative emission tester of claim 1, wherein said evaporative tester is a stand-alone unit.

4. The evaporative emission tester of claim 1, wherein said evaporative tester is adaptably connectable for communication with a host computer.

5. The evaporative emission tester of claim 1, wherein said signal processing means includes a microprocessor circuit.

6. A method for evaluating an evaporative emission control system, which system includes an evaporative canister which stores fuel vapors from a fuel tank for drawing to an intake manifold of an internal combustion engine, the method comprising:

connecting a venturi in series between the canister and the intake manifold;

sensing fuel vapor pressure at inlet and constricted regions of the venturi and generating a differential pressure signal representative of fuel vapor flow rate through the venturi;

generating a fuel vapor flow rate signal, at predetermined time intervals, in response to at least said differential pressure signal;

adding values associated with said fuel vapor flow rate signal at successive intervals over a predetermined period to generate a totalized flow rate value; and comparing the totalized flow rate value to a minimum allowable pass-test value.

7. The method of claim 6, further comprising the step of generating an absolute pressure signal representative of absolute pressure in the venturi, wherein said fuel vapor flow rate signal is a function of said absolute pressure signal as well as the differential pressure signal.

8. The method of claim 6, further comprising the steps:

of setting custom test parameters using a user interface; and notifying a user of system pass-fail conditions.

9. An evaporative emission tester for evaluating an evaporative emission control system, which system includes an evaporative canister which stores fuel vapors from a fuel tank for drawing to an intake manifold of an internal combustion engine, the tester comprising:

a flow sensor apparatus including a venturi having an inlet region and a constricted region coupled in series between the canister and the intake manifold, and further including a differential pressure sensor pneumatically coupled to the inlet and constricted regions of said venturi for generating a differential pressure indicating signal; and signal processing means coupled to said sensor for generating a fuel vapor flow rate signal having a value which is a function of the differential pressure indicating signal, said signal processing means including means for totalizing the fuel vapor flow rate signals, measured at predetermined time intervals, over a given time period, and means for comparing a value representative of the totalized flow rate signals to a minimum acceptable test-pass value.

10. An evaporative emission tester for evaluating an evaporative emission control system, which system includes an evaporative canister which stores fuel vapors from a fuel tank for drawing to an intake manifold of an internal combustion engine, the tester comprising:

a flow sensor apparatus including a venturi having an inlet region and a constricted region coupled in series between the canister and the intake manifold, and further including a differential pressure sensor pneumatically coupled to the inlet and constricted regions of said venturi for generating a differential pressure indicating signal;

signal processing means coupled to said sensor for generating a fuel vapor flow rate signal having a value which is a function of the differential pressure indicating signal;

user interface means for setting custom test parameters; and means for notifying a user of system pass-fail conditions.

* * * * *